United States Patent [19]

Kanemori et al.

[11] Patent Number: 5,164,851
[45] Date of Patent: Nov. 17, 1992

[54] ACTIVE MATRIX DISPLAY DEVICE HAVING SPARE SWITCHING ELEMENTS CONNECTABLE TO DIVISIONAL SUBPIXEL ELECTRODES

[75] Inventors: Yuzuru Kanemori, Tenri; Mikio Katayama, Ikoma; Hiroaki Kato, Nara; Kiyoshi Nakazawa, Fujiidera, all of Japan

[73] Assignee: Sharp Kabushiki Kaisha, Japan

[21] Appl. No.: 647,634

[22] Filed: Jan. 31, 1991

[30] Foreign Application Priority Data

Feb. 5, 1990 [JP] Japan .................... 2-26766

[51] Int. Cl.$^5$ ............... G02F 1/133; H01L 27/12; G09F 9/30
[52] U.S. Cl. ....................... 359/59; 359/87; 340/784
[58] Field of Search ............... 350/332, 334, 333, 336; 340/784; 357/23.7, 45, 4

[56] References Cited

U.S. PATENT DOCUMENTS

| | | | |
|---|---|---|---|
| 4,775,861 | 10/1988 | Saito | 350/333 |
| 4,781,438 | 11/1988 | Noguchi | 350/336 |
| 4,820,222 | 4/1989 | Holmberg et al. | 340/784 |
| 4,894,690 | 1/1990 | Okabe | 357/23.7 |
| 4,907,861 | 3/1990 | Muto | 350/334 |
| 4,938,565 | 7/1990 | Ichikawa | 350/332 |
| 5,033,823 | 7/1991 | Shannon | 350/334 |
| 5,045,753 | 9/1991 | Katayama et al. | 359/87 |
| 5,062,690 | 11/1991 | Whetten | 359/59 |
| 5,076,666 | 12/1991 | Katayama et al. | 359/59 |

FOREIGN PATENT DOCUMENTS

| | | |
|---|---|---|
| 0381428 | 8/1990 | European Pat. Off. . |
| 59-101693 | 6/1984 | Japan . |
| 61-56382 | 3/1986 | Japan . |
| 61-153619 | 7/1986 | Japan . |
| 0230118 | 10/1986 | Japan .................. 350/336 |
| 63-309921 | 12/1988 | Japan .................. 340/784 |
| 1-048036 | 2/1989 | Japan .................. 359/59 |
| 1-048037 | 2/1989 | Japan . |
| 1-144092 | 6/1989 | Japan . |
| 1-169430 | 7/1989 | Japan .................. 340/784 |
| 0224723 | 9/1989 | Japan .................. 350/336 |

Primary Examiner—Janice A. Howell
Assistant Examiner—Tai V. Duong
Attorney, Agent, or Firm—Nixon & Vanderhye

[57] ABSTRACT

An active matrix device has pixel electrodes (40), each of which is divided into a plurality of divisional pixel electrodes (41, 42). Each divisional pixel electrode (41, 42) has a corresponding switching element (31, 32). A junction bridges adjacent ones of the divisional pixel electrodes (41, 42), and at least one spare switching element (34) is disposed in proximity to the junction. The junction has a pair of metal pieces (44, 45) electrically connected to the respective pixel electrodes (41, 42), an output terminal (74) of the spare switching element (34), and a joint metal layer (46) on which both of the metal pieces (44, 45) and the output terminal (74) of the spare switching element (34) are superposed with an insulating film (54) placed therebetween.

8 Claims, 5 Drawing Sheets

ACTIVE MATRIX DISPLAY DEVICE HAVING SPARE SWITCHING ELEMENTS CONNECTABLE TO DIVISIONAL SUBPIXEL ELECTRODES

RELATED APPLICATION

This application is related to U.S. patent application Ser. No. 07/685,680 filed Apr. 16, 1991 entitled "An Active Matrix Display Device" and naming Katayama et al as inventors.

BACKGROUND OF THE INVENTION

1. Field of the Invention

The present invention relates to display devices driven to perform a display operation by a drive signal being applied to a pixel electrode through a switching element and, more particularly, to an active matrix display device of the type having pixel electrodes arranged in a matrix for high density display.

2. Description of the Prior Art

Display devices, such as a liquid crystal display device, an EL display device, and a plasma display device, have been known in which a display pattern is formed on the screen by selectively driving pixel electrodes arranged in a matrix fashion. A voltage is applied between a selected pixel electrode and counter electrode opposed thereto whereby the display medium present therebetween is optically modulated. Such optical modulation is visually observed in the form of a display pattern. A driving system for pixel electrodes of the active matrix drive type has been known such that independent pixel electrodes are arranged in position and a switching element is connected to each of the pixel electrodes for driving same. Switching elements for selectively driving pixel electrode, such as TFT (thin film transistor) elements, MIM (metal-isolator-metal) elements, MOS transistor elements, diodes, and varistors, are generally known. The active matrix drive system exhibits high-contrast display capability, and is already put in actual use for application to liquid-crystal televisions, computer terminal display devices and the like.

When employing such type of display device for high density display operation, it is necessary to arrange a very large number of pixel electrodes and switching elements in position. However, there may be cases in which some switching elements have been already formed as defective elements when they are formed on a substrate. Pixel electrodes connected to such a defective element will produce a pixel defect which is not contributive to the display.

A construction for correcting pixel defects is disclosed in, for example, Japanese Laid-Open Patent Publication No. 61-153619. According to the construction, a plurality of switching elements are provided for each pixel electrode. One of the plurality of switching elements is connected to a pixel electrode, and the others are not connected to pixel electrodes. If the switching element connected to the pixel electrode should go wrong, the switching element is disconnected from the pixel electrode by means of a laser trimmer, an ultrasonic cutter or the like, and another switching element is connected to the pixel electrode. Connection between the switching element and the pixel electrode is effected by depositing fine pieces of a conductor by means of a dispenser or the like, or applying a coat of such material as Au or Al to a specified portion on the substrate. In Japanese Laid-Open Patent Publication Nos. 61-56382 and 59-101693 there is disclosed a construction such that a laser beam is applied to cause metal melting thereby to cause the individual metal layers to be electrically connected.

The correction of defects according to the foregoing constructions must be carried out when the active matrix substrate is in its condition prior to being assembled into a display device. However, it is extremely difficult to locate any pixel defect in the stage of active matrix substrate. Especially in the case of a large-size display device having as many pixels as 100,000 to 500,000 or more, it is necessary to employ high-precision measuring instruments in order to detect electrical characteristics of all the pixel electrodes involved and to locate defective switching elements. This complicates the process of inspection and hampers mass-production economy, thus resulting in increased cost. For this reason, as a matter of fact, it is impractical to carry out such pixel defect correction of the active matrix substrate before assembling the display device using such means as laser beams with respect to large-type display devices having a large number of pixels.

FIG. 5 shows one example of a conventional active matrix substrate having a redundant arrangement. A gate bus line 21 which functions as a scanning line, and a source bus line 23 which functions as a signal line are provided in intersecting relation on a insulative substrate. A pixel electrode 40 is formed in a region surrounded by the gate bus lines 21 and source bus lines 23. A gate bus branch line 22 extends from a location on the gate bus line 21 adjacent to an intersecting point of the gate bus line 21 and source bus line 23 and toward the region in which the pixel electrode 40 is formed. Formed on the gate bus branch line 22 is a thin film transistor (hereinafter referred as "TFT") 31 as a switching element. A source electrode 61 of the TFT 31 is connected to the source bus line 23, and a drain electrode 72 thereof is connected to the pixel electrode 40. A spare TFT 34 is also formed on the gate bus branch line 22. A source electrode 64 of the spare TFT 34, as is the case with the source electrode 61 of the TFT 31, is connected to the source bus line 23. However, the drain electrode 74 of the spare TFT 34 is not connected to the pixel electrode 40 but is provided in proximity to the pixel electrode 40 so that it may be later connected thereto.

In this active matrix display device, if a pixel defect occurs as a result of some trouble in the TFT 31, the spare TFT 34 is used to correct the defect. The spare TFT 34 is electrically connected to the pixel electrode 40. As stated above, this connection is effected by depositing fine conductor pieces by means of a dispenser or the like, or applying a coat of Au, Al or the like to specified site on the substrate, or melting the metal layers by application of a laser beam to thereby provide electrical connection. As already mentioned, however, these methods of correction must be carried out when the provision of TFT's on the substrate is completed, and cannot be carried out in the assembled display device itself, in which the location of the pixel defect can easily be determined.

In a display device employing an active matrix substrate as shown in FIG. 5, pixel defects caused by an insulation failure or the like of the pixel electrode 40 cannot be corrected. In order to reduce the effect of such pixel defect occurrence, it is conceivable to divide the pixel electrode 40 into a plurality of divisional pixel electrodes and to provide each divisional pixel electrode with a TFT. According to such arrangement, even if any pixel defect should occur as a result of some isolation failure of a divisional pixel electrode, it is possible to prevent the pixel defect from extending to the whole pixel electrode.

In such a display device, while it is possible to avoid the entire pixel electrode suffering a pixel defect as a result of any insulation failure or the like of a divisional pixel electrode, the entire pixel electrode cannot normally function as such when some failure has occurred in one of the TFT's connected to the divisional pixel electrodes. As such, considering the problem of TFT defects only, the substrate shown in FIG. 5 is advantageous only because of its redundancy.

SUMMARY OF THE INVENTION

The active matrix display device of this invention, which overcomes the above-discussed and other numerous disadvantages and defections of the prior art, comprises a pair of insulating substrates, at least one of the substrates being transparent, a display medium charged between the pair of substrates and whose optical characteristics can be modulated in response to a voltage applied, pixel electrodes arranged into a matrix on the inner surface of one of the pair of substrates, each of said pixel electrodes being divided into a plurality of divisional pixel electrodes, switching elements electrically connected to the respective divisional pixel electrodes, at least one junction bridging adjacent ones of said divisional pixel electrodes, and at least one spare switching element disposed in proximity to said junction, said junction having a pair of metal pieces electrically connected to the respective adjacent divisional pixel electrodes, an output terminal of said spare switching element, and a joint metal layer on which both of the metal pieces and said output terminal of said spare switching element are superposed with an insulating film placed therebetween.

In a preferred embodiment, each of said switching elements and the divisional pixel electrode corresponding thereto are spaced apart from each other by 5 $\mu$m or more.

In some embodiment, the active matrix display device further comprises scanning lines and scanning branch lines branched from said scanning lines, said switching elements and said spare switching element being formed on one of said scanning branch lines.

In some embodiment, the active matrix display device further comprises scanning lines, signal lines and signal branch lines branched from said signal lines, said switching elements and said spare switching element being formed on one of said scanning lines and connected to one of said signal lines via one of said signal branch lines.

Thus, the invention described herein makes possible the objective of providing an active matrix display device which is less liable to the effect of any pixel defect caused by insulation failure of a pixel electrode, and which permits easy correction of the pixel defect in the existing state of the device in which the location of the defect can be easily determined.

With the construction of the active matrix device as above described, it is possible to readily locate a pixel electrode in which a pixel defect is present by driving all the pixel electrodes of the display device. As all pixel electrodes are driven, a display medium corresponding to the normal pixel electrode is subjected to optical modulation according to the driving voltage. In the case of a switching element defect, however, such optical modulation does not occur and some pixels are visually determined as being defective. Even in a large display device having as many fine pixel electrodes as hundreds of thousands, such defective pixels can be easily discriminated by using a magnifying lens or like means.

When the location of the pixel defect is determined, light energy, such as a laser beam, is emitted from an external source through the transparent substrate to the superposed portion of the junction including the pair of metal pieces and the joint metal layer. As a result of the laser beam irradiation, dielectric breakdown of the insulation film between the pair of metal pieces and the joint metal layer occurs. As a result of the breakdown of the insulation film, respective metal pieces connected to adjacent divisional pixel electrodes and the joint metal layer are electrically connected.

In this way, adjacent divisional pixel electrodes are electrically connected through the junction. When correction is effected in this way, two adjacent divisional electrodes are driven by one switching element. As such, there may be cases where an adjacent pair of divisional pixel electrodes cannot normally be driven. In such cases, light energy emission is again effected to electrically connect the output terminal of the spare switching element and the joint metal layer together. As a result of this connection, an adjacent pair of divisional pixel electrodes are driven by one normal switching element and the spare switching element.

As stated above, by electrically connecting the spare switching element to the joint metal layer, it is possible to correct any pixel electrode even when a pixel defect has occured on account of some trouble with the two switching elements connected to adjacent divisional pixel electrodes. Through such connection, two adjacent divisional pixel electrodes suffering from a pixel defect can also be driven by one spare switching element.

One of the pair of metal pieces connected to the divisional pixel electrode to which the defective switching element is connected may be electrically connected to the joint metal layer and, in turn, the joint metal layer may be connected to the output terminal of the spare switching element. When such connection is made, the divisional pixel electrode in which the pixel defect is present is driven by the spare switching element, and the normal divisional pixel electrode is driven only by the original normal switching element.

In any of the above described cases, if the pixel defect is caused by some leak trouble of the switching element, the defective switching element is disconnected from the pixel electrode by light energy irradiation.

In the active matrix display device of the invention, no pixel defect can be corrected if the pixel defect has occurred on account of some insulation failure in one of the divisional pixel electrodes. However, since the pixel electrode is divided into a plurality of divisional pixel electrodes, if any pixel defect should occur in one of the divisional pixel electrodes, such pixel defect does not cause the entire pixel to be defective.

According to the construction of the present invention, it is possible to reduce the effect of any pixel defect due to insulation failure of divisional pixel electrodes. Any pixel defect due to troubles in the switching elements can be corrected on the display device in such condition that the location of the pixel defect is easily identified. Therefore, the invention provides for improved yield and reduced cost in display device production.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
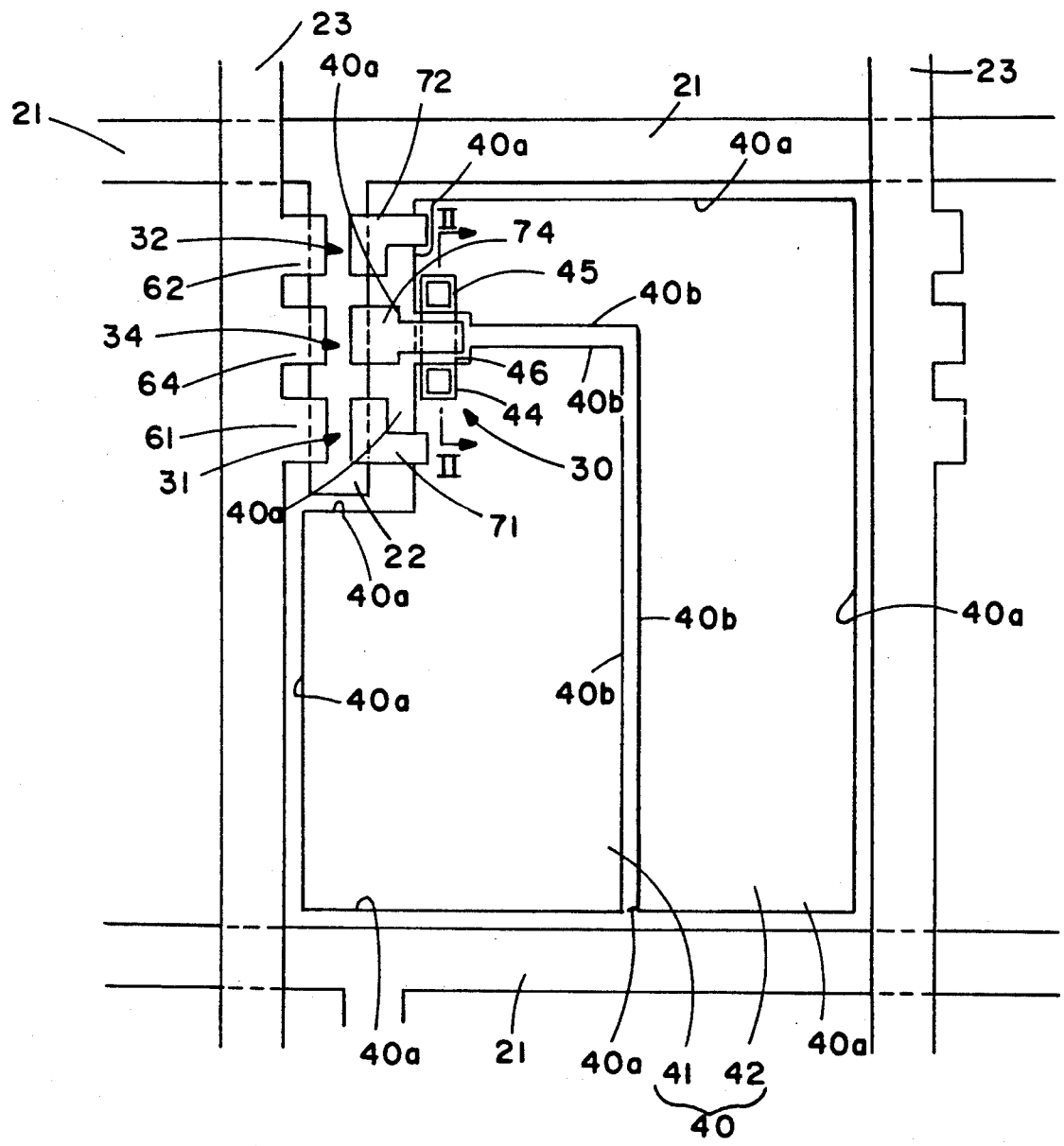
FIG. 1 is a plan view of an active matrix substrate employed in one embodiment of the active matrix display device according to the invention.
Figure 2:
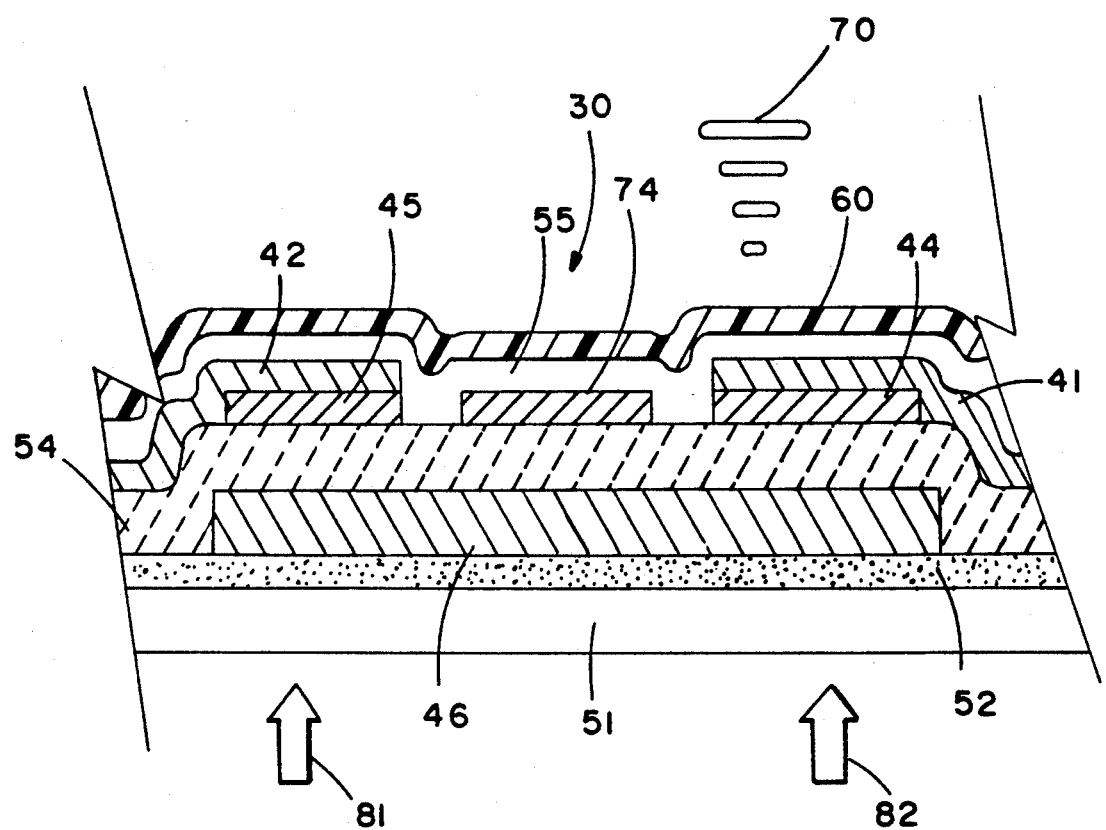
FIG. 2 is a section taken along line II—II in FIG. 1.

FIG. 1 shows a plan view of an active matrix substrate employed in one embodiment of the active matrix device of the invention. FIG. 2 is a section taken along line II—II in FIG. 1. This embodiment represents a transparent type liquid crystal display device, but description herein equally applies to a reflector type liquid crystal device. The embodiment will be described according to the process of fabrication. A base coat film 52 is deposited on a transparent insulating substrate 51. In the present example, a glass substrate is used for the transparent insulating substrate 51. For the base coat film 52, materials such as $SiN_x$, $Ta_2O_5$, and $Al_2O_3$ are useful. In this example, $Ta_2O_5$ is used. A thickness range suitable for the base coat film 52 is 3000 to 9000 Å, but in this example it is set within a range of 2000 to 3500 Å. The base coat film 52 need not necessarily be provided.

Next, a Ta metal layer is deposited on the base coat film 52 using spattering technique, and a patterning of the Ta metal layer is carried out to form a gate bus line 21 as a scanning line and a gate bus branch line 22 as a scanning branch line. Materials suitable for the gate bus line 21 and gate bus branch line 22 are single layers of Ta, Ti, Al, Cr, etc. or multiple metal layers of these. A joint metal layer 46 is pattern-formed simultaneously with the gate bus line 21 and gate bus branch line 22. Therefore, the joint metal layer 46 is also formed of Ta metal. Then, a gate insulating film 54 is deposited all over the substrate 51. The gate insulating film 54 may be formed of the same material as the base coat film 52. In the present example, an $SiN_x$ film formed by plasma CVD method is used. A suitable thickness range for the gate insulating film 54 is 1000 to 7000 Å. In this example, the thickness of the gate insulating film 54 is set within the range of 2000 to 3500 Å.

Then, TFTs 31, 32 and a spare TFT 34 are prepared using the conventional production procedure. The TFTs 31, 32 and spare TFT 34 function respectively The TFTs 31, 32 and spare TFT 34 function respectively as switching elements and a spare switching element. On the above mentioned gate insulating film 54 are deposited in succession an intrinsic semiconductor amorphous silicon (hereinafter referred to as "a-Si(i)") layer which will later become a semiconductor layer, and an $SiN_x$ layer which will later become an etching stopper for the semiconductor layer. Then, a patterning of the $SiN_x$ layer is carried out to form the etching stopper. Again, a P (phosphorus)-doped n+ amorphous silicon (hereinafter referred as "a-Si(n+)") layer is deposited all over the substrate 51 using plasma CVD method. The a-Si(n+) layer will later become contact layers for an ohmic contact between the semiconductor layer and source and drain electrodes which are to be formed. Patterning is carried out of the a-Si(n+) layer and the a-Si(i) layer to form the semiconductor layer and the contact layers.

Subsequently, a Ti metal layer is formed all over the substrate using the spattering technique and, in turn, patterning is carried out to form a source bus line 23 as a signal line, source electrodes 61, 62, 64, drain electrodes 71, 72, 74, and metal pieces 44, 45. Suitable materials for these are metals such as Al, Mo, and Cr, in addition to Ti. Through the above described process, the main TFTs 31, 32 and spare TFT 34 are formed on the gate bus branch line 22, as shown in FIG. 1. As FIG. 2 shows, the metal pieces 44 and 45 are formed on the gate insulating film 54 and located at opposite ends of the joint metal layer 46, and the drain electrode 74 as an output terminal of the spare TFT 34 is centrally located in relation to the joint metal layer 46. Therefore, the joint metal layer 46, and the metal pieces 44, 45 and the drain electrode 74 of the spare TFT 34 are in superposed relation, with the gate insulating film 54 positioned therebetween. A junction 30 is comprised of the joint metal later 46, gate insulating film 54, metal pieces 44, 45, and the drain electrode 74 of the spare TFT 34, in combination.

Next, a pixel electrode 40 made of a transparent conductive film is formed all over the substrate. In this example, an ITO (indium tin oxide) film formed by the spattering technique is used for the transparent conductive film. Patterning of the ITO film is carried out to form the pixel electrode 40. As shown in FIG. 1, the pixel electrode 40 has a pixel electrode perimeter 40a. As FIG. 1 shows, the pixel electrode 40 consists of divisional electrodes 41 and 42. As FIG. 2 shows, divisional electrodes 41 and 42 are also formed on the metal pieces 44 and 45 respectively. As shown in FIG. 1, the divisional electrodes 41, 42 have interior edges 40b which substantially abut one another. Therefore, the metal pieces 44 and 45 are electrically connected to the divisional pixel electrodes 41 and 42 respectively.

As seen in FIG. 2, the metal layer 46 is formed under the metal pieces 44, 45, and the electrode 74, and hence under the divisional pixel electrodes 41, 42. Moreover, as seen in FIG. 1, the metal layer 46, the metal pieces 44, 45, and the electrode 74 are all formed within (i.e., not extending beyond) the pixel electrode perimeter 40a.

A protective film 55 is formed all over the substrate 51 on which the pixel electrode 40 is formed. In this example, $SiN_x$ is used for the protective film. The protective film is formed all over the substrate 51, but alternatively it may be of an open-window construction such that the protective film is removed away centrally on the divisional pixel electrodes 41 and 42. In order to prevent leakage of light from the space between the divisional pixel electrodes 41 and 42, an optical shield may be formed between the divisional pixel electrodes 41 and 42 by using a Ta metal layer or the like.

Next, an orientation film 60 is formed all over the protective film 55. The active matrix substrate shown in FIG. 1 has now been completed. On a counter substrate opposed to the active matrix substrate of FIG. 1 are formed a counter electrode comprised of ITO and an orientation film. Liquid crystal layer 70 as a display medium is charged between the substrate of FIG. 1 and the counter substrate opposed thereto, and thus the active matrix display device of the present example is completed.

In the active matrix display device of the present example, any pixel defect due to troubles in the TFTs 31 and 32 can be corrected if it should occur. There are two types of TFT troubles, namely, disconnection trouble and leakage trouble. A disconnection problem refers to a condition in which there is no current flow between the source electrode and the drain electrode when the TFT is in on-state. A leakage problem refers to a condition in which current flows between the source electrode and the drain electrode when the TFT is in the off-state. Where a pixel defect has occurred by reason of either TFT disconnection problem or leakage problem, the pixel defect is corrected in the following manner.

First, the active matrix display device is driven as a whole so as to determine the location of the pixel defect. As all pixel electrodes are driven, the orientation of corresponding liquid crystal molecules in the liquid crystal layer 70 are converted according to the driving voltage and are optically modulated. However, if one of the TFT's 31 and 32 is defective, such optical modulation does not occur and some of the pixels are visually identified as defective pixels. The defective pixels can readily be discriminated by using a magnifying lens.

In cases where the TFT 31 connected to the divisional pixel electrode 41 is defective, an optical energy such as a laser beam is applied, as shown by arrows 81, 82 in FIG. 2, through the transparent substrate 51 to the superposed portions of the junction 30 which include the metal pieces 44, 45, and joint metal layer 46 respectively. In this example, a YAG laser beam was used as an optical energy. Through the application of laser beam dielectric breakdown of the gate insulating film 54 occurs at portions thereof between the metal piece 44 and the joint metal layer 46 and between the metal piece 45 and joint metal layer 46. As a result of the dielectric breakdown of the gate insulating film 54, respective metal layers 44 and 45 connected to adjacent divisional pixel electrodes 41 and 42 are electrically connected. In the present embodiment, the presence of the protective film 55 prevents metal or the like melted by laser beam application from inclusion into the liquid crystal layer 70. In this way, the divisional pixel electrode 41 to which the defective TFT 31 has been connected is electrically connected to the divisional pixel electrode 42 through the joint metal layer 46 of the junction 30. When connection is made in this way, the two adjacent divisional pixel electrodes 41 and 42 are driven by one TFT There may be cases where the two adjacent pixel electrodes 41 and 42 cannot be driven in order when a pixel defect is corrected in the above mentioned manner. In such cases, the drain electrode 74 as the output terminal of the spare TFT 34 and the joint metal layer 46 are electrically connected together by optical energy irradiation. As a result of this connection, the two adjacent divisional pixel electrodes 41 and 42 are driven by the one normal TFT 32 and the spare TFT 34.

When the spare TFT 34 is electrically connected to the joint metal layer 46 in the above mentioned manner, a pixel defect can be corrected even if such defect has occurred throughout the pixel electrode 40 on account of some trouble with both of the TFTs 31 and 32. By making a connection in the above mentioned way it is possible to drive two defective divisional pixel electrodes 41 and 42 by one spare TFT 34.

It may be also possible to connect electrically only the metal piece 44, which is connected to the divisioal pixel electrode 41 to which is connected the defective TFT 31, with the joint metal layer 46 which, in turn, may be electrically connected to the drain electrode 74 of the spare TFT 34. Through such connections the divisional pixel electrode 41 which causes pixel defect is driven by the spare TFT 34, and the divisional pixel electrode 42 in normal operation is driven by the normal TFT 32 only.

In either of the above cases, if the TFT 31 is defective, the drain electrode 71 of the defective TFT 31 is irradiated by optical energy so that the divisional pixel electrode 41 and the defective TFT 31 are separated from each other. In order to carry out such disconnection accurately, it has been established that the TFT 31 and the divisional pixel electrode 41 must be spaced not less than 5 μm apart.

In the case where a pixel defect has occurred because of some trouble with the TFT 32 connected to the divisional pixel electrode 42, it is apparent that the pixel defect can be corrected in same manner.

In the active matrix display device of the invention, if any pixel defect is due to some isolation failure with one of the divisional pixel electrodes 41, 42, the pixel defect cannot be corrected. However, because of the fact that the pixel electrode 40 is divided into two divisional pixel electrodes 41 and 42, if a pixel defect should occur with one of the divisional pixels 41, 42, the other divisional pixel electrode does operate in normal manner. Therefore, the pixel electrode 40 will not wholly suffer from pixel defects.

Figure 3:
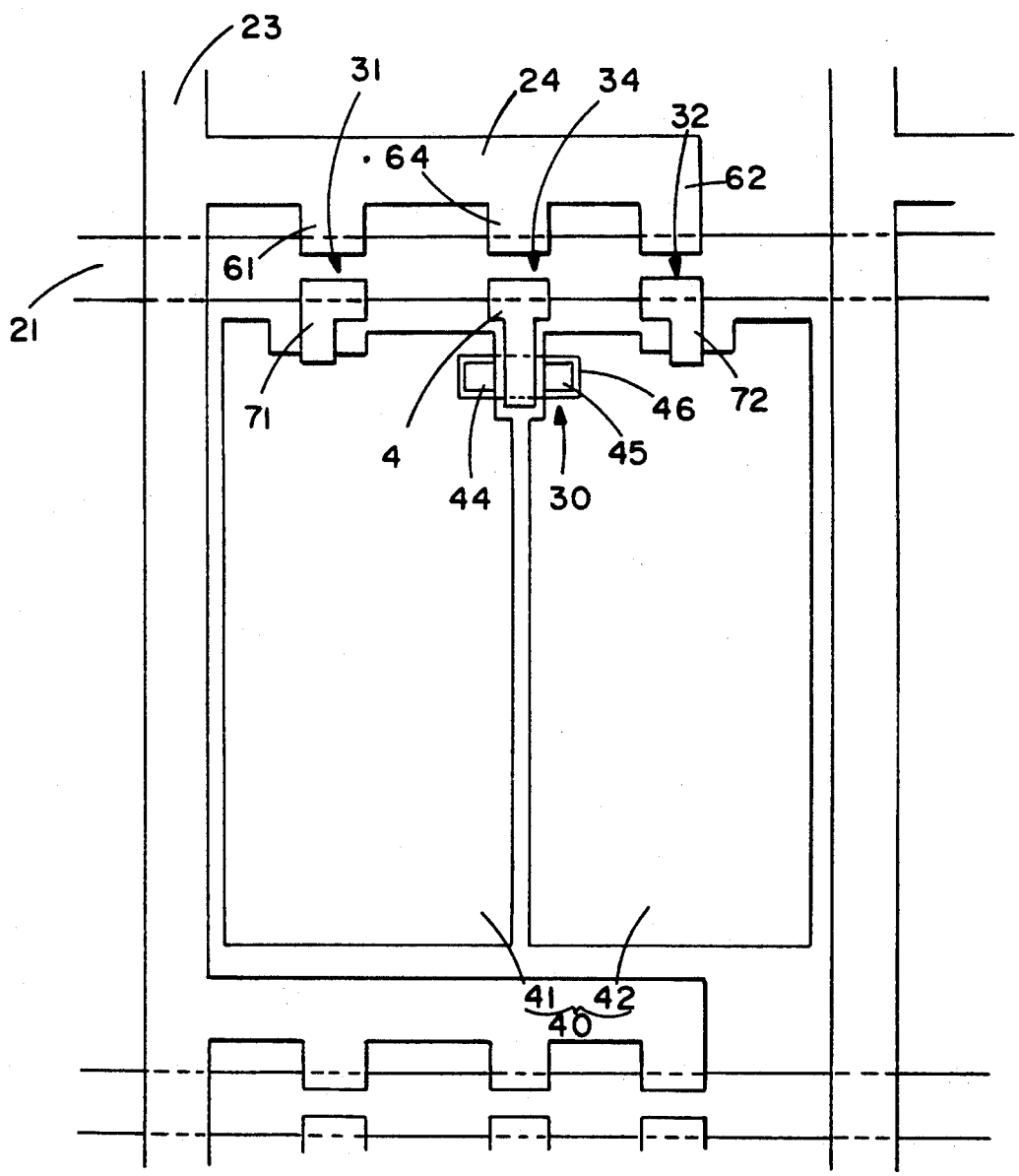
FIG. 3 is a plan view of an active matrix substrate employed in another embodiment of the active matrix display device of the invention.

FIG. 3 shows a plan view of an active matrix substrate employed in another embodiment of the invention. In this embodiment, TFTs 31, 32 and a spare TFT 34 are placed directly on a gate bus line 21. No gate bus branch line 22 is provided. Respective source electrodes 61, 62, and 64 of the TFTs 31, 32 and the spare TFT 34 are electrically connected to a source bus line 23 by a source bus branch line 24. The sectional configuration of a junction 30 is same as that shown in FIG. 2. In this embodiment as well, any pixel defect caused by some trouble in the TFTs 31, 32 can be corrected in same manner as in the case of the FIG. 1 embodiment.

Figure 4:
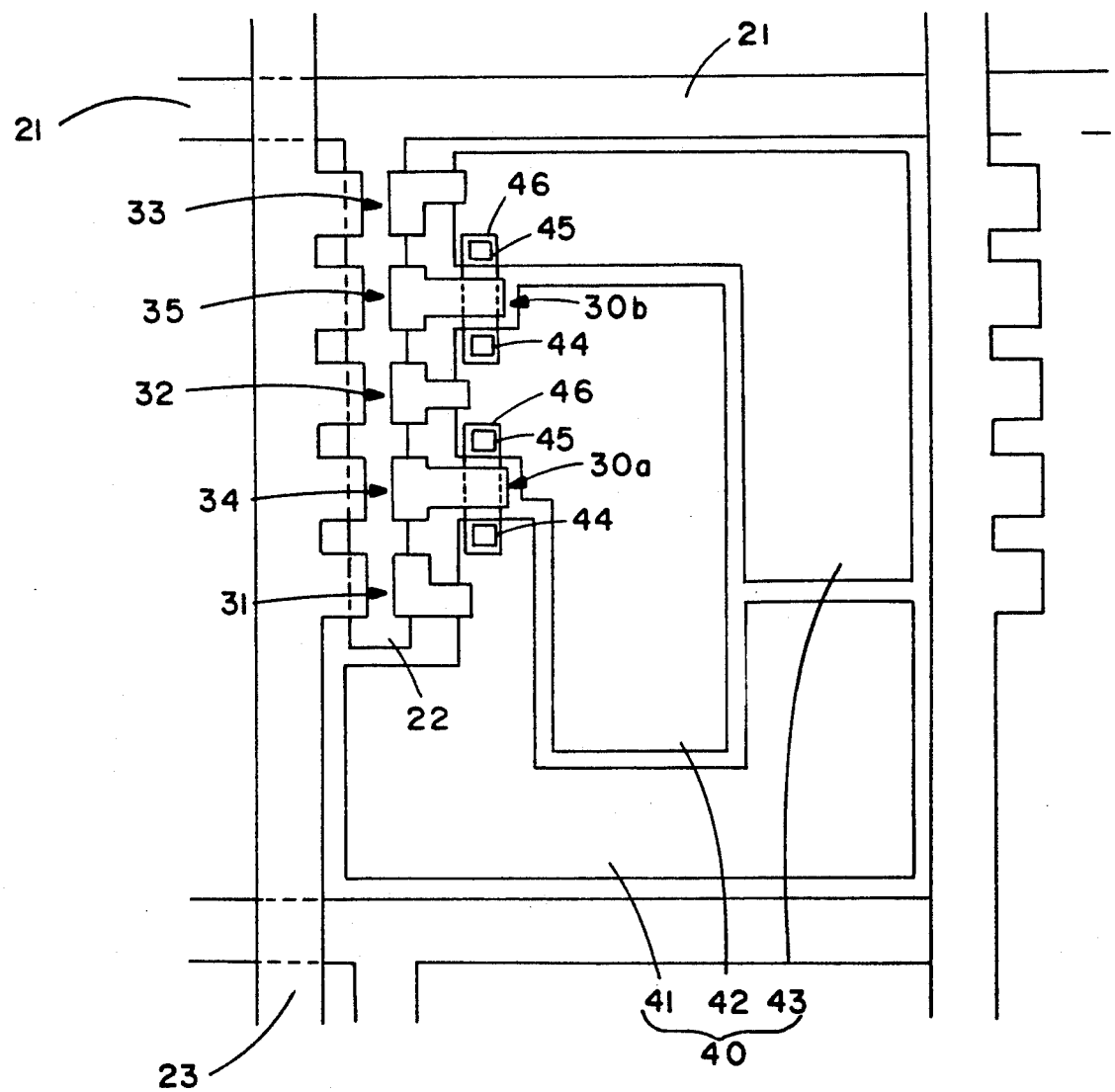
FIG. 4 is plan view of an active matrix substrate employed in still another embodiment of the display device of the invention.
Figure 5:
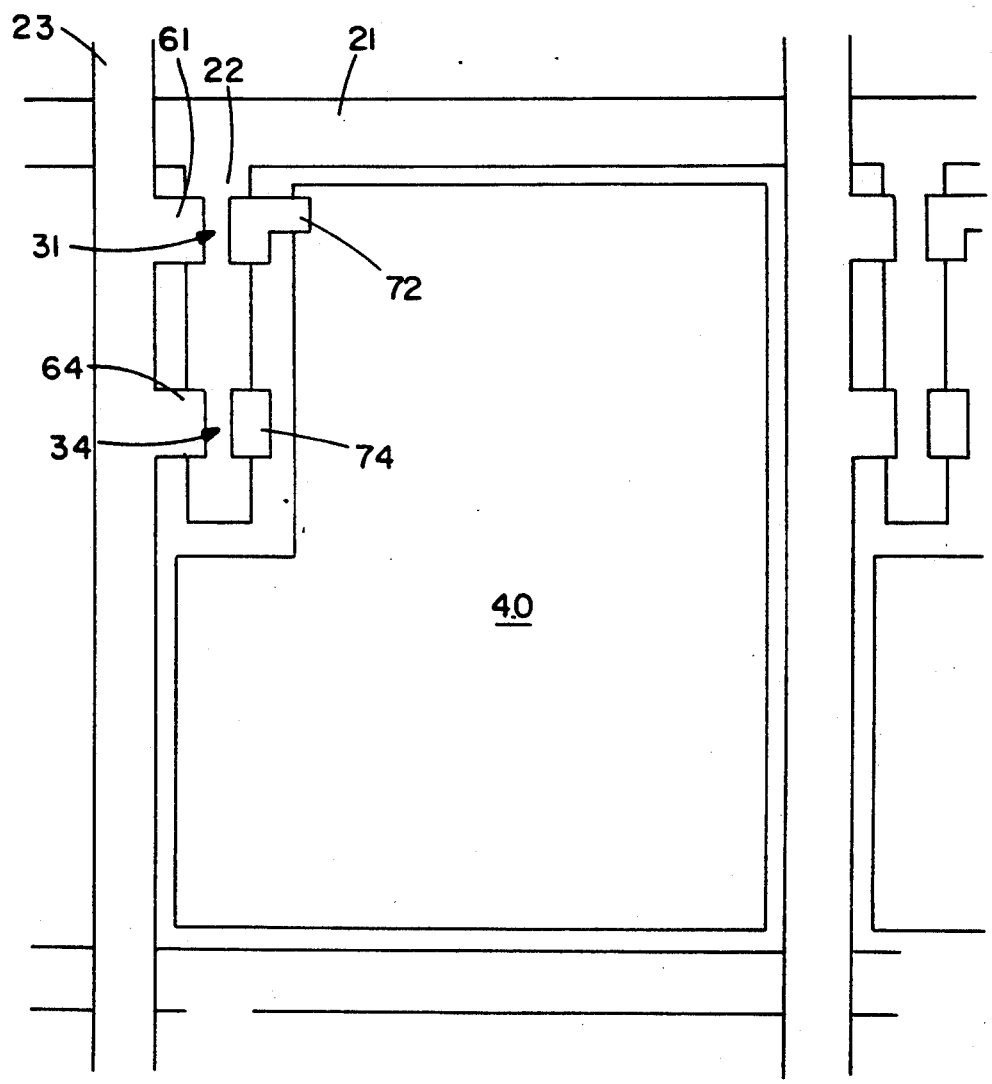
FIG. 5 is a plan view of an active matrix substrate employed in a conventional display device.

FIG. 4 shows a plan view of an active matrix substrate employed in still another embodiment of the invention. In this embodiment, the pixel electrode 40 is divided into three divisional pixel electrodes 41, 42, and 43. To the divisional pixel electrodes 41, 42, 43 are connected TFTs 31, 32, and 33 respectively. These TFTs 31, 32, 33 are formed on a gate bus branch line 22. Between adjacent two divisional pixel electrodes 41 and 42 is formed a junction 30a which bridges therebetween. A spare TFT 34 is formed in proximity to the junction 30a. A drain electrode of a spare TFT 34 extends over a joint metal layer 46 of the junction 30a. Likewise, between the divisional pixel electrodes 42 and 43 is formed a junction 30b which bridges therebetween, a spare TFT 35 is formed in proximity to the junction 30b. A drain electrode of a spare TFT 35 extends over a joint metal layer 46 of the junction 30b. Similarly to the TFTs 31, 32, 33, the spare TFTs 34, 35 are formed on the gate bus branch line 22. the sectional configuration of the junctions 30a and 30b is same as that shown in FIG. 2.

In this embodiment, if a pixel defect has been caused by some trouble in the TFT 31 or 32, the pixel defect can be corrected by using the junction 30a in the same manner as in the embodiment of FIG. 1. Likewise, where a pixel defect has been caused by some trouble in TFT 32 or 33, the pixel defect can be corrected by using the junction 30b in same manner as in the embodiment of FIG. 1. Therefore, any pixel defect due to some trouble in the TFT 32 can be corrected by using one of the junctions 30a and 30b. In the embodiment, since the pixel electrode 40 is divided into three divisional pixel electrodes 41, 42, 43, if one of the divisional pixel electrodes go wrong dielectrically, thus causing some pixel defect, possible degradation of the image quality due to the pixel defect can be restrained insofar as the remaining two divisional pixel electrodes operate in normal order.

In the embodiment of FIG. 4, the pixel electrode 40 is divided into three divisional pixel electrodes; but it may be possible to divide a pixel electrode into a larger number of divisional pixel electrodes. However, division of the pixel electrode into a larger number of divisional pixel electrodes results in an increase in the area occupied by the TFTs and spare TFTs and accordingly the aperture ratio (the ratio of a portion contributive to display to the area of the screen) of the display device is lowered. Therefore, it is necessary that the pixel electrode should be divided into a proper number of divisional pixel electrodes.

With reference to each of the foregoing three embodiments, description is limited to an active matrix type liquid crystal display device using TFTs as switching elements. It must be understood, however, that the invention is not limited to such construction. The invention is also applicable to a wide variety of display devices using various types of switching elements, such as MIM elements, diodes, and varistors. Further, the invention is applicable to various types of display devices using a thin film luminescent layer, a dispersion type EL layer, a plasma luminophor, and the like.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix display device comprising:
a pair of insulating substrates, at least one of the substrates being transparent,
a display medium charged between the pair of substrates and whose optical characteristics can be modulated in response to a voltage applied,
pixel electrodes arranged into a matrix on the inner surface of one of the pair of substrates, each of said pixel electrodes including a plurality of divisional pixel electrodes,
main switching elements electrically connected to the respective divisional pixel electrodes,
at least one junction bridging adjacent parts of said divisional pixel electrodes,
at least one spare switching element disposed in proximity to said junction, so as to substitute for said main switching element which is visually detected as defective, and
said junction having a pair of metal pieces electrically connected to, and formed under, parts of the respective adjacent divisional pixel electrodes, an output terminal of said spare switching element, and a joint metal layer on which both of the metal pieces and said output terminal of said spare switching element are superposed with an insulating film placed therebetween.

2. An active matrix display device according to claim 1, wherein each of said main switching elements and the divisional pixel electrode corresponding thereto are spaced apart from each other by 5 $\mu$m or more.

3. An active matrix display device according to claim 1, which further comprises scanning lines and scanning branch lines branched from said scanning lines, said main switching elements and said spare switching element being formed on one of said scanning branch lines.

4. An active matrix display device according to claim 1, which further comprises scanning lines, signal lines and signal branch lines branched from said signal lines, said main switching elements and said spare switching element being formed on one of said scanning lines and connected to one of said signal lines via one of said signal branch lines wherein said spare switching element is disposed between said main switching elements.

5. An active matrix display device comprising:
a pair of insulating substrates, at least one of the substrates being transparent,
a display medium charged between the pair of substrates and whose optical characteristics can be modulated in response to a voltage applied,
pixel electrodes arranged into a matrix on the inner surface of one of the pair of substrates, each of said pixel electrodes having a pixel electrode perimeter, each of said pixel electrodes including within the pixel electrode perimeter a plurality of divisional pixel electrodes, the divisional pixel electrodes having interior edges which substantially abut one another,
main switching elements electrically connected to the respective divisional pixel electrodes,
a spare switching element having an output terminal;
a junction bridging adjacent divisional pixel electrodes included in a pixel electrode, said junction comprising:
a pair of metal pieces electrically connected to, and formed under, the respective adjacent divisional pixel electrodes,
the output terminal of said spare switching element, and
a joint metal layer covered with an insulating film above which both of the metal pieces and said output terminal of said spare switching element are superposed, the metal layer and the metal pieces all formed within the pixel electrode perimeter.

6. An active matrix display device according to claim 5, wherein each of said main switching elements and the divisional pixel electrode corresponding thereto are spaced apart from each other by 5 $\mu$m or more.

7. An active matrix display device according to claim 5, which further comprises scanning lines and scanning branch lines branched from said scanning lines, said main switching elements and said spare switching element being formed on one of said scanning branch lines.

8. An active matrix display device according to claim 5, which further comprises scanning lines, signal lines and signal branch lines branched from said signal lines, said main switching elements and said spare switching element being formed on one of said scanning lines and connected to one of said signal lines via one of said signal branch lines wherein said spare switching element is disposed between said main switching elements.

* * * * *